March 1, 1960 D. J. JONES 2,927,249
METAL ENCLOSED ELECTRIC SWITCHGEAR
Filed Aug. 14, 1957 3 Sheets-Sheet 1
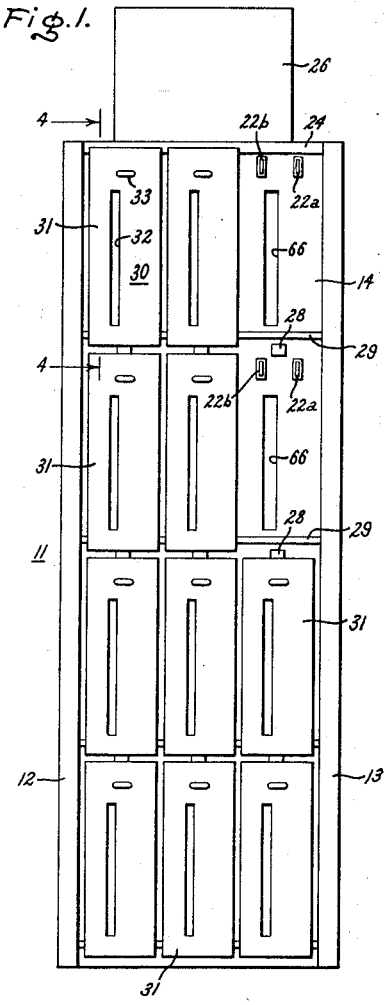
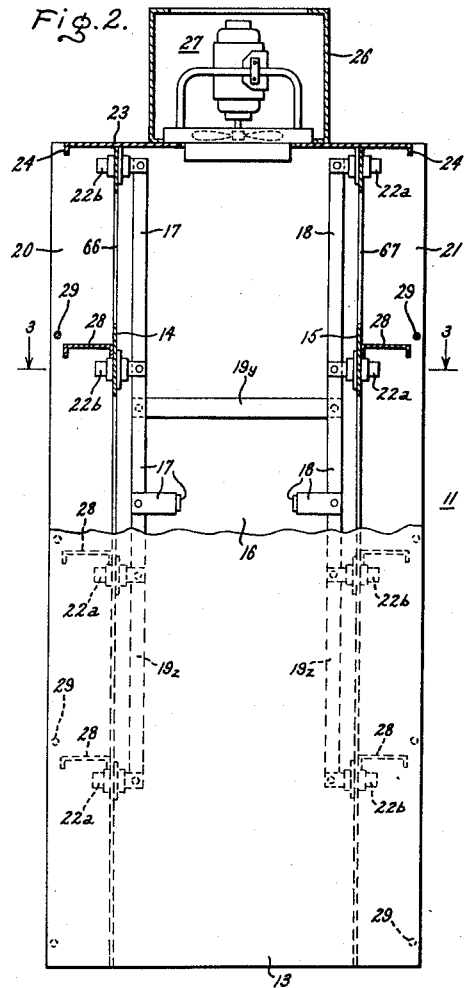
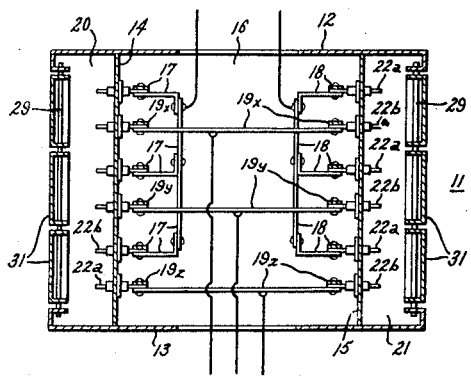
Inventor:
Daniel J. Jones,
by His Attorney.

March 1, 1960 D. J. JONES 2,927,249
METAL ENCLOSED ELECTRIC SWITCHGEAR
Filed Aug. 14, 1957 3 Sheets-Sheet 2
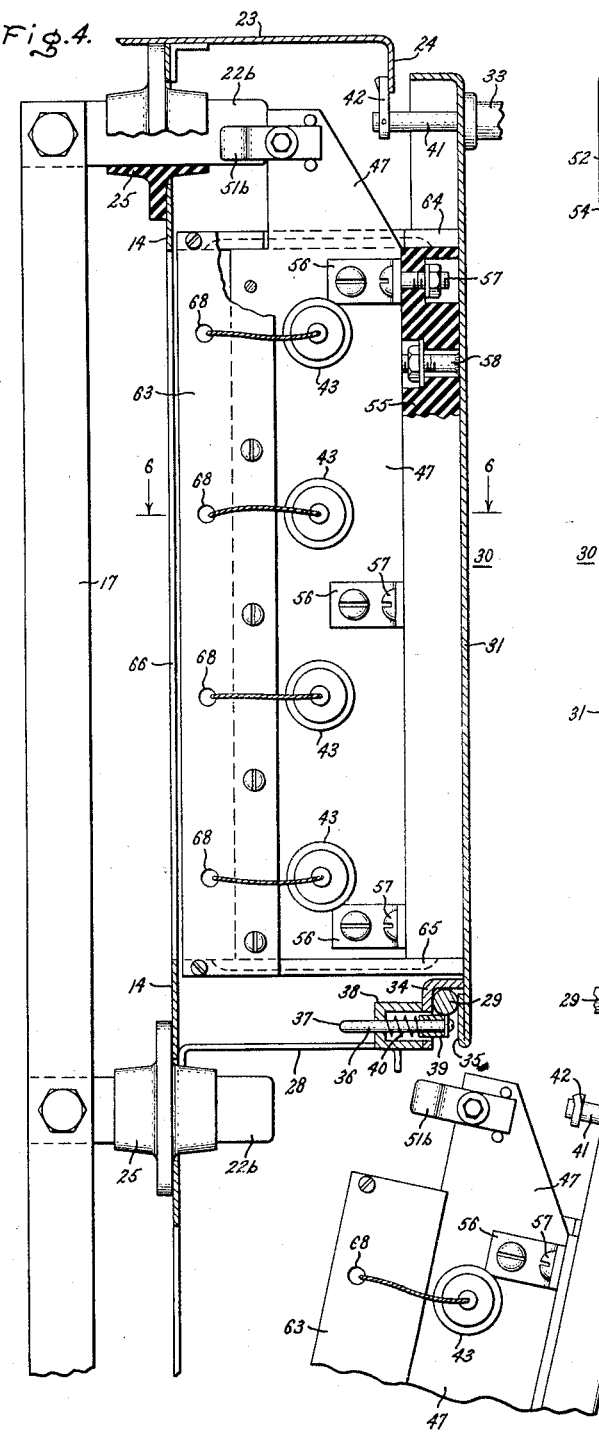
Inventor:
Daniel J. Jones,
by J. Wesley Hauber
His Attorney.

March 1, 1960 D. J. JONES 2,927,249
METAL ENCLOSED ELECTRIC SWITCHGEAR
Filed Aug. 14, 1957 3 Sheets-Sheet 3
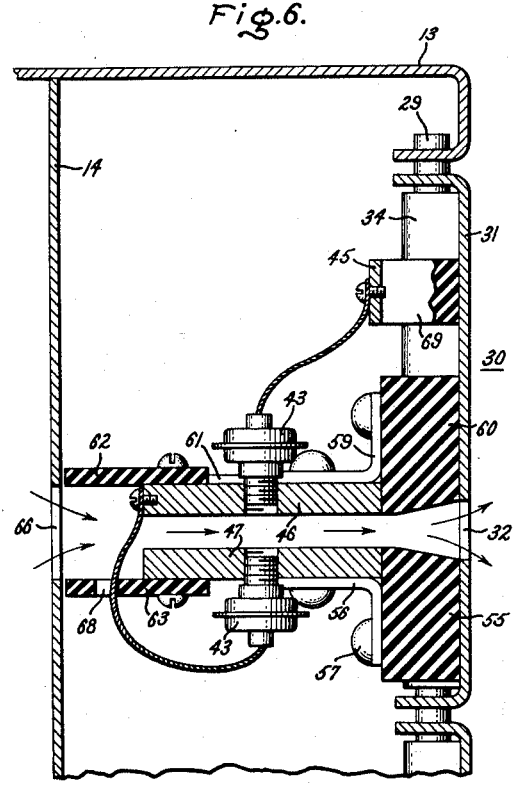
Inventor:
Daniel J. Jones,
by *J. Wesley Kauber*
His Attorney.

United States Patent Office 2,927,249
Patented Mar. 1, 1960

2,927,249

METAL ENCLOSED ELECTRIC SWITCHGEAR

Daniel J. Jones, Glenolden, Pa., assignor to General Electric Company, a corporation of New York Application August 14, 1957, Serial No. 678,191

12 Claims. (Cl. 317—99)

This invention relates to metal enclosed electric switchgear, and more particularly to switchgear of the type wherein removable units adapted to support electric devices such as overcurrent-responsive circuit interrupters and the like are mounted in a cooperating stationary housing.

In the art of electric power distribution and utilization it is common practice, principally for reasons of safety, to locate current carrying buses and associated electric devices within grounded metal enclosures or housings. For convenient inspection, maintenance and replacement, the electric devices usually are mounted on individual units that are readily removable from appropriate compartments in the housing. These removable units and the mechanisms by which they are inserted into and withdrawn from their respective compartments are sometimes quite complex and expensive. Accordingly, it is a general object of the present invention to provide a relatively simple and inexpensive arrangement of removable units in metal enclosed electric switchgear.

A more specific object of the invention is to provide means for removably hinging electric device supporting units in a stationary housing.

Another object of the invention is the provision of improved metal enclosed electric switchgear particularly adapted for forced air cooling of electric devices mounted on removable units.

Still another object is to provide power rectifier equipment comprising a metal enclosed housing with removable units for mounting a plurality of half-wave rectifiers.

In carrying out my invention in one form, a stationary housing having spaced apart vertical sidewalls and an open front is provided with a rod-like member supported by the side walls and extending horizontally therebetween adjacent the open front. A movable unit comprising a generally flat panel member is provided with means for removably hinging the panel member on the rod-like member, and a latch is provided to fasten the panel member in a vertical position thereby closing at least a portion of the open front of the housing. The movable unit is adapted to support electric devices such as a plurality of half-wave rectifiers. The electric devices are connected to suitable movable electric contacts which are disposed to project rearwardly from the panel member. Cooperating stationary electric contacts are mounted to project frontwardly from a suitable barrier disposed in the housing, whereby vertical swinging motion of the movable unit causes the movable and stationary contacts to engage or disengage.

The aforementioned movable unit includes structural means arranged to provide a hollow passageway extending from an aperture in the panel member to a corresponding aperture in the intermediate barrier. This structural means includes the supporting means for the electric devices. An upstanding bus compartment is provided in the housing behind the intermediate barrier, and suitable bus bars are located in this compartment and connected to the stationary electric contacts. The housing is adapted to support means for initiating a flow of a cooling medium through the bus compartment, the barrier aperture, the passageway, and the panel aperture, thereby cooling both the bus bars and the electric devices supported by the movable unit. In one aspect of my invention, a plurality of the horizontally extending rod-like members are disposed at different elevations adjacent both the front and the rear of the housing, and a plurality of interchangeable movable units are removably hinged in side-by-side relationship on each one of the rod-like members, whereby a complete equipment such as a power rectifier is provided.

The invention will be better understood and its various objects and advantages will be more fully appreciated from the following description taken in conjunction with the accompanying drawings in which:

Fig. 1 is a front elevation of a preferred embodiment of the invention;

Fig. 2 is a side elevation, partly in section, of the Fig. 1 embodiment with all of the removably hinged units removed;

Fig. 3 is a sectional view of the equipment of Fig. 2 along the line 3—3;

Fig. 4 is an enlarged sectional view of a removably hinged unit along the line 4—4 of Fig. 1;

Fig. 5 is a rear view of the removable unit of Fig. 4;

Fig. 6 is a sectional view of the removable unit of Fig. 4 along the line 6—6;

Fig. 7 is a diagrammatic illustration of the circuitry of a single removable unit in accordance with the illustrated embodiment of the invention; and Fig. 8 is a diagrammatic illustration of the circuitry of a polyphase electric power rectifier that is provided by the equipment illustrated in Fig. 1.

Referring now to Figs. 1, 2 and 3, the illustrated embodiment of the invention is seen to comprise a stationary enclosure or housing indicated generally by the reference number 11. The housing 11 has parallel, spaced apart vertical sidewalls 12 and 13 preferably comprising suitable sheets or plates of steel having front and rear edges turned inwardly to form generally U-shaped vertical troughs, as can be seen most clearly in Fig. 3.

As is shown in Figs. 2 and 3, the depth of the housing 11 is divided into three parts by a pair of spaced apart, parallel vertical barriers 14 and 15 disposed perpendicular to the sidewalls 12 and 13 intermediate their front and rear edges. These intermediate barriers define an upstanding inner compartment 16 in which suitable electric bus bars 17, 18, 19x, 19y and 19z are mounted, and both the front 20 and the rear 21 of the stationary housing are open. With regard to either the front or the rear of the housing, when considered independently, the sidewalls 12 and 13 and the barriers 14 and 15 provide an enclosed rear compartment for bus bars and an open front compartment.

In the inner compartment 16 of housing 11 the bus bars 17, 18, 19x, 19y and 19z are electrically connected to and physically supported by a plurality of spaced apart pairs of stationary electric contacts 22a and 22b. The stationary electric contacts may be supported, for example, by means of suitable bushings 25 of insulating material mounted on the intermediate barriers 14 and 15 (see Fig. 4) so that each contact projects both frontwardly and rearwardly in relation to the barrier and outwardly in relation to the inner compartment 16. As is indicated in Figs. 2 and 3, the pairs of stationary electric contacts 22a and 22b are arranged in horizontally aligned rows located at four different elevations on each of the barriers, each row including three pairs of contacts. The specific connections between the respective stationary contacts and the various bus bars within the inner bus compartment 16 are shown in Fig. 3.

The top of the housing 11 is closed by means of a flat horizontal plate 23 having an aperture in its center and downturned flanged parts 24 along both its front and rear edges. Centrally disposed on top of plate 23 is a cubicle 26 which is open at its top and bottom. An electric fan 27 or the like is mounted in cubicle 26 to initiate a flow of air or other cooling medium through the inner compartment 16 of the housing 11. The fan may be arranged either to force air into the housing or to exhaust air from the housing, the former being preferable since the air can be cleaned by a suitable filter (not shown) located in cubicle 26. The bottom of the inner compartment 16 of housing 11 is sealed by a flat metal plate or the like (not shown) thereby preventing undesirable leakage of cooling air in this area.

Nine separate flanged parts or clips 28 are mounted on the outwardly facing surfaces of each one of the barriers 14 and 15. Three of these parts are arranged in spaced relation in each of three different horizontal rows. As is shown in Fig. 2, each part 28 is disposed generally perpendicular to its supporting barrier, and the outer end of each part provides a downturned flange.

In accordance with the invention, a plurality of rod-like members 29 are supported by the sidewalls 12 and 13 and extend horizontally therebetween at four different elevations adjacent both the front and the rear of the housing 11. The locations of the rod-like members are vertically spaced with respect to the flanged parts 24 and 28, respectively. Three interchangeable, movable units or panel structures 30 are removably hinged in side-by-side relationship on each rod-like member 29 for swinging movement into vertical positions. Thus, there are twelve removable units at the front of housing 11 (Fig. 1) and a total of twenty-four such units associated with the housing 11.

Each unit or panel structure 30 comprises a generally flat, rectangular-shaped panel member 31 having a slot-like aperture 32 therein. Each panel member is adapted to support appropriate electric devices. Suitable hinging means (to be described in detail hereinafter) is disposed adjacent the lower edge of the panel member 31, and a latch including handle 33 is disposed adjacent its upper edge. The panel members 31 preferably are made of steel, and when disposed in their normal vertical planes, they close both the front 20 and the rear 21 of the housing 11.

The detailed construction of a typical movable unit or panel structure 30 is shown clearly in Figs. 4, 5 and 6. Reference to these figures will show that the panel member 31 is pan-shaped, having rearwardly disposed flanges formed along its vertical and upper horizontal edges. The hinging means for the panel member 31 comprises a U-shaped bracket 34 affixed to the panel member adjacent its lower edge. The opposing sidewalls or legs of the bracket 34 are spaced apart sufficiently to receive the rod-like member 29, whereby the panel structure may be pivotally attached to any one of the rod-like members. Preferably the frontward sidewall or leg 35 of the bracket 34 comprises the rear surface of the panel member 31, and in effect the bracket is a U-shaped slot formed in the panel structure.

The open side of the U-shaped bracket 34 is closed by means of a cooperating slidably supported handle which in the illustrated embodiment of the invention projects perpendicular to and rearwardly from panel member 31. Preferably the handle comprises a single U-bolt having a pair of parallel, spaced apart arms 36 rigidly interconnected at their rearward ends by a transverse rod 37. The free ends of the arms 36 are slidably inserted into cylindrical casings 38 and extend frontwardly to bridge the parallel legs of the bracket 34. Each casing 38 is mounted on the rearward leg of the bracket, as best seen in Fig. 4.

The free end of each arm 36 is provided with an enlarged band 39 having a diameter greater than that of bias means such as a coil spring 40 disposed on the arm between the band 39 and the rear wall of the casing 38. Thus, the arms 36 of the slidable handle are urged frontwardly to a bracket-closing position wherein they capture or retain the rod-like member 29 within the bracket 34. In this position, shown in Fig. 4, the panel structure 30 can be pivoted about the member 29 with a vertical swinging motion. By manually gripping the transverse rod 37 and pulling in a rearward direction with respect to the panel member 31, the slidable handle is moved against its bias to withdraw the free ends of arms 36 and liberate the member 29, whereby the panel structure 30 and member 29 are uncoupled. The panel can now be conveniently removed from the housing 11.

The panel structure 30 is provided with a latch mounted adjacent the upper edge of the member 31. This latch includes the operating handle 33, a shaft 41 extending through the panel member and projecting rearwardly therefrom, and a cam or lever 42 attached to the rearward end of the shaft 41. With the panel member 31 in a vertical position, the latch is disposed in cooperating relationship with one of the flanged parts 24 or 28 of the housing, whereby the cam 42 may be rotated behind the flanged part to fasten the panel member in its vertical position.

It will now be apparent that in order to remove the panel structure 30 from the housing 11, the panel structure must first be unfastened by turning handle 33 of the latch, and then it can be pivoted away from the front of the housing to provide access to rod 37 of the slidable handle of the removable hinging means. The swinging motion of the panel structure to a non-vertical position operates to disconnect the electric devices mounted thereon, and therefore these devices are de-energized before being exposed outside of the housing 11. With the panel structure in a horizontal position, for example, a man holding the handle 33 in one hand may safely grasp and pull the rod 37 with his other hand to release the panel structure 30 from the rod-like member 29, and the handle 33 and rod 37 provide convenient means for carrying the panel structure away from the housing.

As has been pointed out hereinbefore, the movable unit or panel structure 30 is adapted to support electric devices. In the illustrated embodiment of the invention the electric devices comprise a plurality of half-wave rectifiers 43 and an overcurrent-responsive circuit interrupter or fuse 44. However, the specific devices are representative only, and other circuit controlling electro-responsive means may be carried by the removably hinged panel structure without departing from the teachings of my invention.

Before considering in detail the illustrated physical arrangement of the half-wave rectifiers 43 and fuse 44 on the panel structure, refer to Figs. 7 and 8 where the electrical circuitry has been set forth diagrammatically. Fig. 7 shows the electric circuit of a single panel structure 30, and Fig. 8 shows the circuitry of the assembled combination of twenty-four panel structures in housing 11. As can be seen in Fig. 7, the forward direction of electric current flow is from point $a$ through the protective fuse 44; to a common elongated bar 45; through one of four parallel circuits each comprising a half-wave rectifier 43, a separate current conducting segment 46 and another serially connected half-wave rectifier 43; and finally by way of a unitary current conducting member 47 to point $b$. Thus, the half-wave rectifiers 43 are connected in parallel groups of series-connected pairs between the fuse 44 and point $b$. A high-impedance voltage dividing resistor 48 may be connected across each half-wave rectifier to improve the electrical characteristics of the current rectifying circuit.

Each panel structure 30 is normally disposed in a vertical position at the front or rear of housing 11. In this position, points $a$ and $b$ of the electric circuit of the panel structure are connected to the corresponding stationary electric contacts 22a and 22b and hence to the bus bars 17 or 18 and 19x, 19y or 19z in the inner compartment 16 of the housing. The bus bars are arranged as shown in Figs. 2 and 3. Bars 19x, 19y and 19z are respectively connected to the secondary windings of a suitable three-phase alternating current electric power transformer 49 (Fig. 8) which may be located adjacent one side of housing 11, while bars 17 and 18 are connected to an appropriate direct current load circuit (not shown) which may be located adjacent the other side of the housing. As a result, a complete power rectifier is provided as shown in Fig. 8, and large amounts of unidirectional current can be delivered to the load circuit. With the arrangement described above, individual half-wave rectifiers rated 50 amperes and 200 peak inverse volts may be used to provide a 300 kilowatt power rectifier capable of supplying a total load current of 1200 amperes D.-C. at 250 volts.

Returning now to Figs. 4 and 5, I will describe the manner in which the circuit is completed between points a and b on the movable panel structure 30 and the associated stationary electric contacts 22a and 22b mounted on the barrier 14 of the stationary housing 11. The panel structure includes a pair of movable electric contacts 51a and 51b disposed to project perpendicular to and rearwardly from the panel member 31 in cooperating relationship with the stationary contacts 22a and 22b, respectively. Each movable electric contact preferably comprises a pair of spaced apart contact elements or fingers of current conducting material. Corresponding ends of the fingers of movable contact 51a are disposed on opposite sides of a copper bar 52 where they are held by the forces of a pair of compression springs 53 shown clearly in Fig. 5. The copper bar 52 is mounted on suitable electric insulating material (not shown) affixed to the rear surface of panel member 31, and this bar also provides support for one mounting clip 54 of the protective fuse 44. In this manner the movable electric contact 51a is connected to the fuse and thereby corresponds to point a of Fig. 7. The fingers of movable contact 51b are disposed in the same fashion on the upper end of the elongated unitary current conducting member 47 (Figs. 5 and 6), and therefore this contact corresponds to point b of Fig. 7.

The spacing between the opposing surfaces of the free ends of each pair of fingers of the electric contacts 51a and 51b is made slightly less than the thickness of each blade-like stationary electric contacts 22a and 22b. As the panel structure 30 is pivoted toward its vertical position, the movable contact fingers engage opposite sides of the corresponding stationary contact and are forced apart. The compression springs 53 yield to permit the necessary lateral deflection of the contact fingers while maintaining firm contact pressure as the fingers slide over the stationary contact. The movable and stationary contacts may be disconnected by swinging the panel structure 30 away from the front of housing 11. This disconnecting process is accomplished without arcing in the illustrated embodiment of the invention, since the voltage and current magnitudes involved are never simultaneously of significance. That is, there is negligible voltage drop across the half-wave rectifiers whenever current is being conducted, and there is negligible current flow whenever inverse voltage is present across the rectifiers.

In accordance with the present invention, the structural means used for mounting the half-wave rectifiers 43 on the panel structure 30 are designed to facilitate cooling of the rectifiers by forced air. Each half-wave rectifier preferably comprises an hermetically sealed junction-type semi-conductor such, for example, as is fully described and claimed in a copending patent application Serial No. 573,258—William F. Lootens, filed on March 22, 1956, and assigned to the present assignee. The semi-conductor rectifying device referred to has particularly desirable asymmetrical conductive characteristics. One terminal of such a device is provided by a threaded stud protruding from the casing, while the other terminal comprises a flexible cable or lead. By screwing the stud of the casing into an appropriate heat sink, the heat generated at the P–N junction of the device may be efficiently removed. Such heat sinks in my invention comprise the aforementioned current conducting segments or plates 46 and the unitary current conducting member 47 which provide both physical mounting for and electrical connection to the half-wave rectifiers 43. As best seen in Fig. 4, four of the half-wave rectifiers are screwed into appropriately tapped holes in the unitary member 47, and as best seen in Fig. 5, four of the rectifiers are respectively screwed into the four separate segments 46.

The unitary member 47 is disposed in a vertical plane perpendicular to a support of electric insulating material 55 to which it is secured by means of suitable angles or clips 56 and appropriate nuts 57. The insulating support 55 is affixed to the rear surface of panel member 31 adjacent one vertical edge of the slot-like aperture 32 by means of suitable studs 58.

As best seen in Figs. 5 and 6, the separate current conducting segments 46 are supported in spaced apart relationship with respect to each other in a common plane parallel to and spaced from the unitary member 47. Each segment 46 is mounted by means of at least one angle or clip 59 on a common support of insulating material 60 disposed adjacent the other vertical edge of the slot 32, and the spaces between adjacent segments are covered by suitable strips of insulation 61.

A pair of rectangular-shaped flat insulating plates 62 and 63 are fastened to the rearwardly disposed portions of the segments 46 and the unitary member 47, respectively, as can be seen in Figs. 4 and 6. The plates 62 and 63 project toward and abut the barrier 14 when the panel structure 30 is in its normal vertical position. It should now be apparent that the insulating supports 55 and 60, the current conducting segments 46 and member 47, and the insulating strips 61 and plates 62 and 63 form opposite sides of a hollow, open-ended passageway extending from the slot 32 in panel member 31 to the barrier 14. The top and bottom of this passageway are closed by an additional pair of electric insulating members 64 and 65 which are horizontally disposed between the upper and lower ends, respectively, of the insulating plates 62 and 63 and extend the depth of the front compartment. See Figs. 4 and 5.

The hollow passageway described above interconnects the aperture 32 in panel member 31 and a corresponding aperture 66 located in barrier 14. Both of the intermediate barriers 14 and 15 of the housing 11 shown in Figs. 1 and 2 are provided with a plurality of apertures 66 and 67, respectively. These apertures or slots are located at different elevations to define a plurality of horizontal rows, whereby the apertures in each barrier are arranged in a uniform relationship with respect to the pairs of stationary contacts 22a and 22b on the same barrier, and each aperture is associated with a different pair of the stationary contacts. With all twenty-four panel structures 30 assembled in housing 11, the rearwardly disposed open end of the passageway formed on each panel structure will abut a corresponding aperture in the associated barrier 14 or 15. See Fig. 6. By directing a cooling medium through the apertures and the passageway, as indicated by arrows in Fig. 6, heat is rapidly dissipated from the unitary current conducting member 47 and from the four current conducting plates or segments 46 which comprise opposite sides of the passageway, and hence the half-wave rectifiers 43 supported by these current conducting parts are effectively cooled.

The bus bars 17, 18, 19x, 19y and 19z, best seen in Figs. 2 and 3, are supported in the inner compartments 16 of housing 11 so that their flatwise surfaces are disposed perpendicularly with respect to the barriers 14 and 15. This particular arrangement permits efficient cooling of the bus bars by the air passing through the inner compartment 16 from fan 27 to the barrier apertures 66 and 67. It will be observed that a movable unit or panel structure can be removed from the housing 11 without significantly detracting from the volume of air being circulated through the passageways in the remaining units.

As can be seen in Fig. 4, four holes 68 are provided in insulating plate 63 so that the flexible cables of the four half-wave rectifiers 43 mounted on unitary member 47 may be connected to the current conducting segments 46. The flexible leads of the four rectifiers 43 mounted on segments 46 are connected to the common elongated bar 45. Bar 45 is supported from the rear surface of panel member 31 by means of a pair of insulating blocks 69 and 70. As is shown in Fig. 5, insulating block 70 also supports another mounting clip 71 of the protective fuse 44. Thus the rectifiers on segments 46 are electrically connected by way of the bar 45 and the fuse 44 to the movable electric contact 51a.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. Electrical apparatus comprising: a housing having spaced apart vertical sidewalls, a vertical rear wall and an open front; a plurality of stationary electric contacts mounted on said rear wall and projecting frontwardly therefrom; a rod-like member supported at opposite ends by said sidewalls, respectively, and extending horizontally therebetween adjacent the front of said housing; a movable, generally flat panel member disposed normally in a vertical plane and adapted to support an electric device; means for removably hinging said panel member on said rod-like member including a generally U-shaped bracket affixed to the panel member and disposed to receive the rod-like member and a movably supported handle having an arm disposed in cooperation with said bracket for releasably retaining said rod-like member within said bracket, said rod-like member being released by manual movement of said handle in order to permit removal of the panel member from the housing; and a plurality of movable electric contacts adapted to be connected to the electric device and disposed to project rearwardly from said panel member in cooperating relationship with said stationary contacts.

2. Electrical apparatus comprising: a housing having spaced apart vertical sidewalls, a vertical rear wall and an open front; a plurality of spaced apart pairs of stationary electric contacts mounted on said rear wall and projecting frontwardly therefrom, said pairs being arranged in horizontally aligned rows located at different elevations on said rear wall; a plurality of rod-like members supported by said sidewalls and extending horizontally therebetween at different elevations adjacent the front of said housing; a plurality of interchangeable, normally vertically disposed panel members removably hinged in side-by-side relationship on each one of said rod-like members; means for mounting at least one electric device on each one of said panel members; and a pair of movable electric contacts mounted on each one of said panel members and projecting rearwardly therefrom in cooperating relationship with a pair of said stationary contacts.

3. In an electrical apparatus: a housing comprising a pair of spaced apart parallel side walls having vertical front and rear edges, said sidewalls being connected by a pair of spaced apart vertical barriers disposed perpendicular to said sidewalls intermediate said edges thereby to form an upstanding inner compartment; a plurality of electric bus bars supported within said compartment; a plurality of spaced apart pairs of stationary electric contacts connected to said bus bars and supported by said barriers to project outwardly therefrom, the pairs of stationary contacts mounted on each one of said barriers being arranged in a plurality of horizontal rows having different elevations; a plurality of rod-like members supported by said sidewalls and extending horizontally therebetween at different elevations adjacent both the front and rear edges thereof; a plurality of interchangeable, generally flat panel members removably hinged on said rod-like members and disposed normally in vertical positions, each one of said panel members being adapted to mount an electric device and at least two of said panel members being hinged in side-by-side relationship on each one of said rod-like members; and a pair of movable electric contacts supported by each one of said panel members to project inwardly therefrom in cooperating relationship with a pair of said stationary contacts.

4. In combination: a housing open at its front and having spaced apart vertical sidewalls; a rod-like member supported by said sidewalls and extending horizontally therebetween adjacent the front of said housing; and a panel structure removably hinged to said rod-like member for swinging movement into a vertical position, said panel structure comprising a generally flat panel member having a U-shaped bracket affixed thereto, the opposing sides of said bracket being spaced sufficiently to receive said rod-like member, and a slidably supported handle having an arm disposed to close the open side of said bracket thereby capturing said rod-like member within said bracket, said handle being biased to its bracket-closing position and being manually movable against its bias to withdraw said arm and liberate said rod-like member.

5. In combination: a housing open at its front and having spaced apart vertical sidewalls, said housing having a flanged part disposed intermediate said sidewalls; a rod-like member supported by said sidewalls and extending horizontally therebetween adjacent the front of said housing in vertically spaced relation to said flanged part; and a removable panel structure pivotally attached to said rod-like member and fastened to said flanged part for closing at least a portion of the open front of said housing, said panel structure comprising a generally flat rectangular-shaped panel member, a latch mounted on said panel member adjacent one edge thereof, said latch projecting rearwardly from said panel member in cooperating relationship with the flanged part of said housing and being manually operable from the front of said panel member, a U-shaped bracket disposed on the rear of said panel member adjacent the opposite edge thereof, the legs of said bracket being spaced apart sufficiently to receive said rod-like member, a handle having an arm slidably mounted in cooperating relationship with said bracket, and bias means for urging said handle to a position wherein said arm bridges the legs of said bracket thereby capturing said rod-like member within said bracket, said handle being manually operable from the rear of said panel member for withdrawing said arm and permitting the removal of said panel structure from said housing after said panel structure has been unfastened and pivoted away from the front of said housing.

6. In combination: a housing open at its front and having spaced apart vertical sidewalls; a plurality of rod-like members supported by said sidewalls and extending horizontally therebetween at different elevations adjacent the front of said housing; and a plurality of removable, interchangeable panel structures pivotally mounted in side-by-side relationship on each one of said rod-like members, said panel structures being disposed normally in a vertical plane thereby to close the open front of said housing, each one of said panel structures comprising a generally flat panel member having a U-shaped slot formed therein, the parallel walls of said slot being spaced apart sufficiently to receive said rod-like member, and a slidably supported handle including an arm disposed to close said slot thereby retaining said rod-like member within said slot, said handle being biased to its slot-like closing position and being disposed for manual operation from the rear of said panel member to withdraw said arm and release said rod-like member after said panel structure has been pivoted to a non-vertical position.

7. In an electrical apparatus: a housing comprising a pair of spaced apart vertical sidewalls, a vertical rear wall, an open front, and an intermediate vertical barrier disposed in spaced apart parallel relationship to said rear wall thereby to form upstanding rear and front compartments, said barrier having an aperture therein; a plurality of electric bus bars supported within said rear compartment; a pair of stationary electric contacts connected to said bus bars and supported by said barrier to project into said front compartment; a rod-like member supported by said sidewalls and extending horizontally therebetween adjacent the front of said housing; a normally vertically disposed generally flat panel member removably hinged on said rod-like member and adapted to support an electric device, said panel member having an aperture therein; a pair of movable electric contacts adapted to be connected to the electric device and supported by said panel member to project toward said barrier in cooperating relationship with said stationary contacts; and structural means mounted on said panel member to provide a hollow passageway extending the depth of the front compartment for interconnecting the apertures in said barrier and in said panel member, respectively; said housing being adapted to support means for initiating a flow of a cooling medium through said rear compartment, said apertures and said passageway.

8. In an electrical apparatus: a housing comprising a pair of spaced apart vertical sidewalls, a vertical rear wall, an open front, and an intermediate vertical barrier disposed in spaced apart relationship to said rear wall thereby to form upstanding rear and front compartments, said barrier having a plurality of spaced apart apertures arranged in horizontally aligned rows located at different elevations; a plurality of electric bus bars supported within said rear compartment and having their flatwise surfaces disposed perpendicularly with respect to said barrier; a plurality of spaced apart pairs of stationary electric contacts connected to said bus bars and supported by said barrier to project into said front compartment, each one of said pairs being associated with one of said apertures; a plurality of rod-like members supported by said sidewalls and extending horizontally therebetween at different elevations adjacent the front of said housing; and a plurality of interchangeable panel structures removably hinged in side-by-side relationship on each one of said rod-like members, each one of said panel structures comprising a normally vertically disposed panel member having an aperture therein, means for removably hinging said panel member on one of said rod-like members, means for mounting an electric device on said panel member, a pair of movable electric contacts adapted to be connected to the electric device and supported by said panel member to project toward said barrier in cooperating relationship with a pair of said stationary contacts, and means including the mounting means for said electric device arranged to provide a hollow passageway extending the depth of said front compartment, the open ends of said passageway being disposed in abuting relationship respectively to the aperture in said panel member and to the corresponding aperture in said barrier; said housing being adapted to support means for directing a cooling medium into said rear compartment and hence through the apertures and passageways.

9. In an electrical apparatus: a housing comprising a pair of spaced apart parallel sidewalls having vertical front and rear edges, an open front, an open rear, and a pair of spaced apart vertical barriers disposed perpendicular to said sidewalls for interconnecting said sidewalls intermediate said edges thereby to form an upstanding inner compartment, each of said barriers having a plurality of spaced apart apertures located at different elevations to define a plurality of horizontal rows; a plurality of electric bus bars supported within said inner compartment; a plurality of spaced apart pairs of stationary electric contacts connected to said bus bars and supported by said barriers to project outwardly therefrom, said pairs being arranged on said barriers in a uniform relationship with respect to said apertures; a plurality of rod-like members supported by said sidewalls at different elevations and extending horizontally therebetween adjacent both the front and rear edges thereof; a plurality of interchangeable, generally flat panel members removably hinged on said rod-like members and disposed normally in vertical positions, said panel members being adapted to support electric devices and each one of said panel members having an aperture therein, at least two of said panel members being hinged in side-by-side relationship on each one of said rod-like members; a pair of movable electric contacts supported by each one of said panel members to project inwardly therefrom in cooperating relationship with a pair of said stationary contacts; structural means mounted on each one of said panel members to provide a hollow passageway extending inwardly from the panel member to the associated barrier to interconnect the aperture in said panel member and the corresponding aperture in said barrier; and means associated with said housing for directing a cooling medium through said inner compartment, said apertures and the passageways.

10. Electrical apparatus comprising: a housing having spaced apart vertical sidewalls, a vertical rear wall and an open front; a plurality of stationary electric contacts mounted on said rear wall and projecting frontwardly therefrom; a generally rectangular-shaped panel member normally disposed in a vertical plane parallel to said rear wall and removably hinged at its lower edge to a rod-like member extending horizontally between said sidewalls at the front of said housing; circuit controlling electro-responsive means mounted on the rear surface of said panel member; and a plurality of movable electrical contacts connected to said electroresponsive means and disposed to project rearwardly from said panel member for cooperatively engaging and disengaging said stationary contacts upon vertical swinging motion of said panel member about said rod-like member; said panel member including a movably supported handle manually operable from the rear of the panel member and disposed to uncouple the panel member and the rod-like member, thereby permitting removal of the panel member from the housing, upon operation of the handle whenever the panel member has been swung to a generally horizontal position.

11. Electrical apparatus comprising: a housing having spaced apart vertical sidewalls, a vertical rear wall and an open front; a plurality of spaced apart pairs of stationary electric contacts mounted on said rear wall and projecting frontwardly therefrom, said pairs being disposed in horizontally aligned rows at different elevations on said rear wall; a plurality of rod-like members supported by said sidewalls and extending horizontally therebetween at different elevations adjacent the front of said housing; a plurality of interchangeable, normally vertically disposed panel members removably hinged in side-by-side relationship on each one of said rod-like members; two movable electric contacts mounted on each one of said panel members and projecting rearwardly therefrom in cooperating relationship with a pair of said stationary contacts; an overcurrent responsive circuit interrupter mounted on each one of said panel members and connected to a first one of the associated movable contacts; and a plurality of half-wave rectifiers mounted on each one of said panel members and connected in parallel groups of series-connected pairs between said circuit interrupter and the second one of the associated movable contacts.

12. In an electrical apparatus: a housing comprising a pair of spaced apart vertical sidewalls, a vertical rear wall, an open front, and an intermediate vertical barrier disposed in spaced apart parallel relationship to said rear wall thereby to form upstanding rear and front compartments, said barrier having an aperture therein; a plurality of electric bus bars supported within said rear compartment; a pair of stationary electric contacts connected to said bus bars and supported by said barrier to project into said front compartment; a rod-like member supported by said sidewalls and extending horizontally therebetween adjacent the front of said housing; and a panel structure removably hinged to said rod-like member for closing at least a portion of said open front, said panel structure comprising a generally flat panel member having an aperture therein, means for removably hinging said panel member on said rod-like member, structural means mounted on the rear of said panel member to form a hollow passageway which extends the depth of said front compartment to interconnect said panel aperture and said barrier aperture when said panel structure is in a vertical position, said structural means including a unitary current conducting member disposed along one side of said passageway and at least two spaced apart current conducting segments disposed along the opposite side of said passageway, two movable electric contacts supported by said panel member to project rearwardly therefrom in cooperating relationship with said stationary contacts, a first one of said movable electric contacts being connected to said unitary current conducting member, at least two half-wave rectifiers mounted on said unitary member and electrically connected respectively between said unitary member and said current conducting segments, respectively, and at least two additional half-wave rectifiers mounted respectively on said segments and connected respectively between said segments and the second movable electric contact; said housing being adapted to support means for directing a flow of cooling medium through said rear compartment, said apertures and said passageway.

References Cited in the file of this patent
UNITED STATES PATENTS

| | | |
|---|---|---|
| 1,692,067 | Welsh | Nov. 20, 1928 |
| 2,169,109 | Muller | Aug. 8, 1939 |
| 2,319,415 | Lightfoot | May 18, 1943 |
| 2,394,060 | Holmes | Feb. 5, 1946 |
| 2,404,230 | Harlow | July 16, 1946 |
| 2,412,989 | Kotterman | Dec. 24, 1946 |
| 2,414,471 | Kotterman | Jan. 21, 1947 |

FOREIGN PATENTS

| | | |
|---|---|---|
| 528,717 | Great Britain | Nov. 5, 1940 |